United States Patent
Arena

(10) Patent No.: US 8,229,357 B2
(45) Date of Patent: Jul. 24, 2012

(54) METHOD AND SYSTEM FOR A PORTABLE WIRELESS RANGE

(75) Inventor: Scott David Arena, Peabody, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1111 days.

(21) Appl. No.: 11/615,076

(22) Filed: Dec. 22, 2006

(65) Prior Publication Data

US 2008/0155098 A1 Jun. 26, 2008

(51) Int. Cl.
*H04B 7/00* (2006.01)
(52) U.S. Cl. ........ 455/41.2; 370/328; 370/315; 709/225
(58) Field of Classification Search .................. 370/337, 370/347, 330, 332, 280; 455/419, 436, 418, 455/450, 452, 403, 554, 422; 709/217; 701/35; 379/229
See application file for complete search history.

(56) References Cited

U.S. PATENT DOCUMENTS

| | | | |
|---|---|---|---|
| 6,650,871 B1 * | 11/2003 | Cannon et al. ................ | 455/41.2 |
| 6,654,616 B1 * | 11/2003 | Pope et al. ................. | 455/556.1 |
| 2002/0137517 A1 * | 9/2002 | Williams et al. .............. | 455/444 |
| 2003/0161265 A1 * | 8/2003 | Cao et al. ....................... | 370/229 |
| 2005/0143007 A1 * | 6/2005 | Guy et al. ..................... | 455/41.3 |
| 2005/0265482 A1 * | 12/2005 | Peek et al. ..................... | 375/316 |
| 2006/0039360 A1 * | 2/2006 | Thawani et al. ............... | 370/352 |
| 2006/0115089 A1 * | 6/2006 | Carter et al. .................. | 380/273 |
| 2006/0199541 A1 * | 9/2006 | Luebke et al. ................ | 455/41.2 |
| 2009/0075589 A1 * | 3/2009 | Giese .............................. | 455/25 |
| 2010/0279609 A1 * | 11/2010 | Black et al. ................... | 455/41.2 |
| 2011/0117907 A1 * | 5/2011 | Hooli et al. ................. | 455/422.1 |
| 2011/0274029 A1 * | 11/2011 | Connelly et al. .............. | 370/315 |

OTHER PUBLICATIONS

Apple, "Airport Extreme", retrieved from the internet at http://www.apple.com/airportextreme/, retrieved from the internet on Dec. 22, 2006.

* cited by examiner

*Primary Examiner* — Nick Corsaro
*Assistant Examiner* — Mahendra Patel

(57) ABSTRACT

A method or system including managing one or more network connections of a first device, receiving a request for network access at the first device from one or more secondary devices, transmitting one or more network access requests to a network for the one or more secondary devices and enabling concurrent network access by the first device and the one or more secondary devices.

14 Claims, 4 Drawing Sheets

METHOD AND SYSTEM FOR A PORTABLE WIRELESS RANGE

BACKGROUND INFORMATION

Wireless networks have become increasingly popular for providing network access to a variety of devices, including: laptops, cell phones, personal digital assistants, cameras, desktop computers and other devices. Wireless networks enable connectivity of devices to networked resources while reducing the need for traditional hard wired network access. Wireless networks may allow for the mobility of such devices within the coverage range of the network. Wireless networks are limited by the range of their transmitted radio signal. The signal of the wireless network is affected not only by distance but also by gaps in coverage within the range of the signal. Such gaps are referred to as deadspots. In many environments wireless access is not available. Deadspots, range limitations and the lack of wireless access affect the mobility of users of wireless devices.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides a method and a system of providing a portable wireless network range extender. The portable wireless network range extender may allow users of a first device to extend the range of a wireless network without the use of dedicated network equipment. The portable wireless network range extender may allow users of that device to access a network while concurrently providing access to other devices.

The portable wireless range extender may be used where the desire for connectivity is only temporary. For example, extending temporary wireless access to an outdoor area where it may not be desirable or practical to locate a permanent wireless access point. The portable wireless range extender may also facilitate communications in temporary work locations such as meeting rooms. The portable wireless range extender may also enable a wireless access point to be mobile reducing the need for multiple wireless access points.

Figure 1:
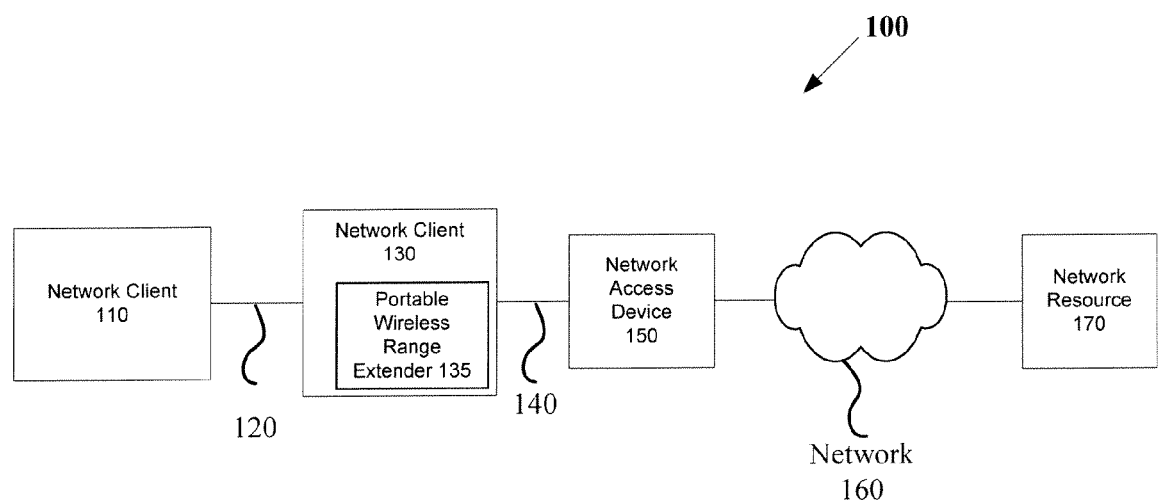
FIG. 1 is an exemplary wireless access network range extender system, according to an embodiment of the present invention.

FIG. 1 is an exemplary wireless access network range extender system, according to an embodiment of the present invention. System 100 illustrates an exemplary system for extending the range of wireless communication with a portable device. As illustrated, Network Client 110 may connect via Network Connection 120 to Network Client 130. Network Client 130 may connect to Network Access Device 150 using Network Connection 140. Connectivity to Network 160 may be provided to Network Client 110 and Network Client 130 via Network Access Device 150. Access to Network 160 may provide access to Network Resource 170.

Network Client 110 may be a portable computer, according to one embodiment. Network Client 110 may also be another device capable of sending and receiving network signals such as a personal digital assistant, desktop computer, workstation, server, cellular telephone or other device. Network Connection 120 may be a wireless connection. For example, this wireless connection may use standard protocols including IEEE 802.11a, 802.11b and 802.11g. Network Client 110 using a wireless connection may authenticate with a network using Wired Equivalent Privacy, Wi-Fi Protected Access or other wireless network security standards.

Network Connection 120 may also be a wired connection using a network connection such as an IEEE Ethernet 802.3, a fiber connection or other connection. Authentication with a Network 160 may be possible for Network Client 110 via Network Connection 120.

Network Client 130 may comprise a laptop computer, a personal digital assistant or other device capable of sending and receiving wireless network signals. Network Client 130 may contain one or more Portable Wireless Range Extender(s) 135. For example, Portable Wireless Range Extender 135 may be software contained on a computer device (e.g., portable computer) or other device with network communication capabilities. Portable Wireless Range Extender 135 may be implemented as a software client designed to work with existing network access devices and software. In other embodiments, Portable Wireless Range Extender 135 may be implemented as hardware providing network communication capabilities for a network client or may be implemented as hardware supplementing communication capabilities for a network client. For example, Portable Wireless Range Extender 135 could be implemented as Universal Serial Bus network card, a PC Card, other external network access device or an internal network card. Portable Wireless Range Extender 135 may also be implemented as a portion of the software supporting a network access device.

Network Access Device 150 may comprise a wireless access point connected to a hub, cable modem, digital subscriber line modem, modem, router or other network device. Network Access Device 150 may be also a hub, an RJ45 Ethernet port or other port supporting wired connectivity. Portable Wireless Range Extender 135 may utilize Network Client 130's wireless networking hardware to receive a network signal and authenticate with Network Access Device 150 creating Network Connection 140, for example. In other examples, Portable Wireless Range Extender 135 may create Network Connection 140 utilizing Network Client 130's wired networking capabilities to support an Ethernet RJ45/Category 5 Ethernet connection, a fiber connection or other wired network connection.

Portable Wireless Range Extender 135 may provide an additional wireless access point to Network 160 using Network Client 130's wireless networking hardware, according to some embodiments. Network Client 110 may receive network access signals from Network Client 130 and may authenticate with Network 160 directly. Once authenticated Network Connection 120 may be formed and Network Client 110 may have access to Network 160 and Network Resource 170. Network 160 may be a local area network, a wide area network, the Internet, or other networks. Access to Network 160 may provide access to one or more resources such as Network Resource 170. Network Resource 170 may be a file server, email server, database, web server, application server or other resource. Portable Wireless Range Extender 135 may provide concurrent wireless connectivity for multiple clients within range of the wireless access signal of Network Client 130.

By way of non-limiting example, Network Client 130 may be a laptop containing Portable Wireless Range Extender 135. If a user of the laptop was located in an area with connectivity to Network 160, such as a back deck of a residence, the user may enable Portable Wireless Range Extender 135. Once enabled, Portable Wireless Range Extender 135 may use the laptop's wireless access device to transmit a network access signal. Network Client 110 may be a second laptop or a personal digital assistant used by a second member of the residence. A user of Network Client 110 may be located further away from Network Access Device 150 than Network Client 130, for example in a back yard of the residence. The user of Network Client 110 may not be capable of receiving a network access signal from Network Access Device 150. However, Network Client 110 may receive the signal from the closer Network Client 130 and may thus connect to Network 160. The users of both devices may be connected concurrently to Network 160.

In other embodiments, Portable Wireless Range Extender 135 may provide wireless connectivity to Network 160 where only wired connectivity is available. For example, Network Client 130 may be in a conference room where there is only one port for a wired network connection such as an RJ45 ethernet port or other port. Network Access Device 150 may be a hub in a network closet down the hall. A user of Network Client 130 may enable Portable Wireless Range Extender 135 and may authenticate to Network 160. This may provide connectivity to Network Client 110 and other network users in the conference room with laptops using wireless network access cards. Multiple users may connect concurrently to Network Client 130. The user of Network Client 130 may be able to access Network 160 concurrently with other users through Portable Wireless Range Extender 135. This may provide access to a Network Resource 170 which may be a file server, web server, email server or other network resource. The user of Network Client 130 may disable Portable Wireless Range Extender 135 eliminating network access for Network Client 110. The user of Network Client 130 may then connect to Network 160 without using Portable Wireless Range Extender 135 if desired.

In yet another embodiment, Portable Wireless Range Extender 135 may provide connectivity for devices with only wired network access. Portable Wireless Range Extender 135 may authenticate with Network 160 using Network Client 130's wireless networking capabilities. Network Client 110 may then connect to a wired network port of Network Client 130 and authenticate with Network 160.

The various components of system 100 may be further duplicated, combined and/or integrated to support various applications and platforms. Additional elements may also be implemented in the system to support various applications.

Figure 2:
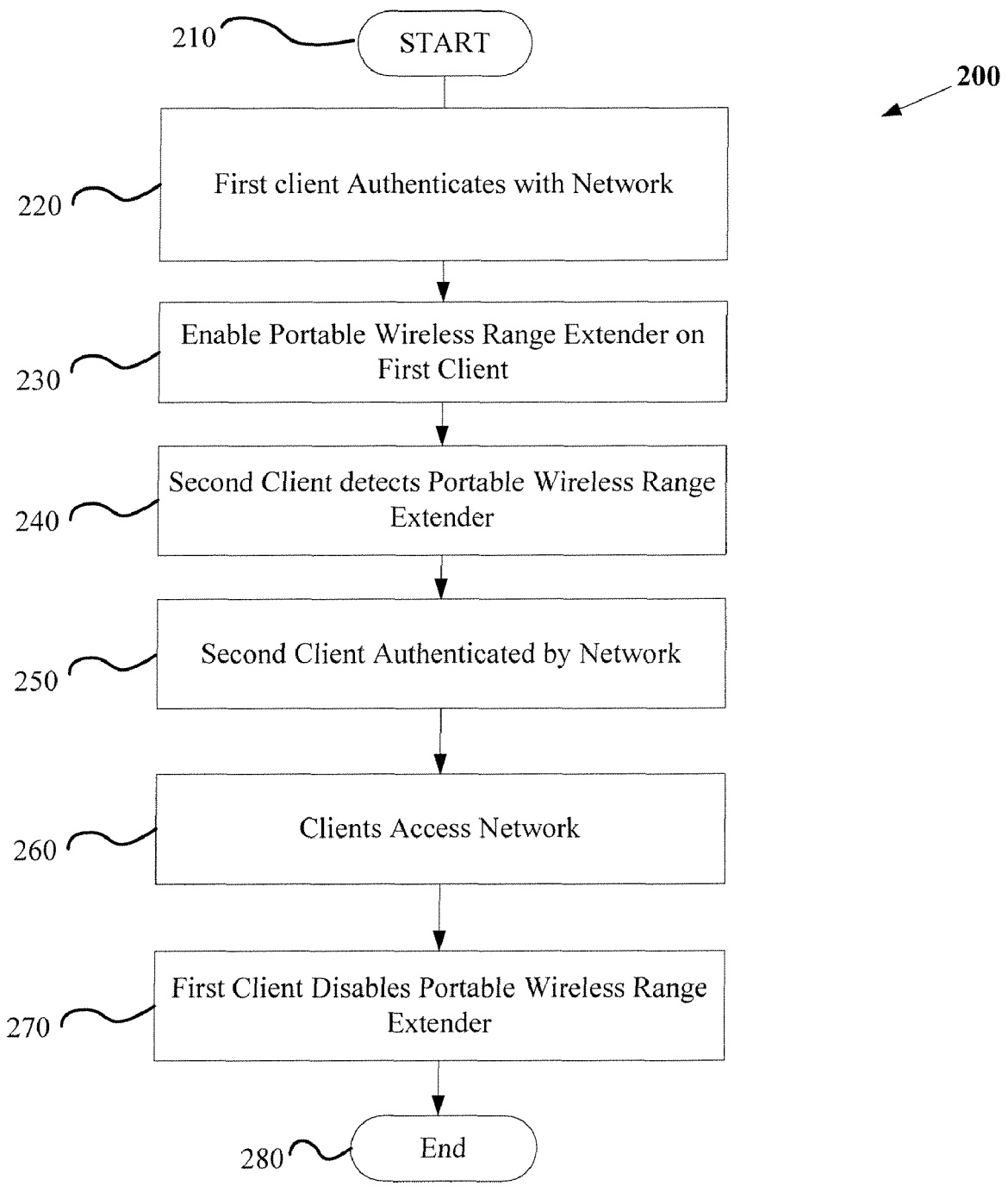
FIG. 2 is a flowchart depicting a method of providing a wireless access network range extender according to an embodiment of the present invention.

FIG. 2 provides a flow chart depicting a method of providing a wireless access network range extender according to an embodiment of the present invention. According to one or more embodiments, flowchart 200 may begin at block 210.

At block 220, a first client may connect and authenticate with a network. The client may be a laptop, desktop, personal digital assistant or other client with a wireless network access device. A client may connect using a wireless connection using, for example, IEEE 802.11a, 802.11b, 802.11g or another wireless networking protocol. In other embodiments, a client may connect using a wired connection such as an RJ45 10/100/1000 Base-T or a fiber connection. The client may authenticate using Wired Equivalent Privacy, Wi-Fi Protected Access or other wireless or wired network security standards.

At block 230, a user of the first client may then enable the Portable Wireless Range Extender on the first client providing a network access signal using the clients wireless network access device. This may provide a wireless network access signal where there was not one if the first client authenticated using a wired connection. This may provide a wireless network access signal extending network access range beyond the range of existing network access devices.

At block 240, a second client may detect the network access signal provided from the first client by the Portable Wireless Range Extender. The second client may be a laptop or other device with a wireless network access device. At block 250, the second client may be authenticated with the network. This may be done using Wired Equivalent Privacy, Wi-Fi Protected Access or other wireless network security standards.

At block 260, both clients may access the network concurrently. The network usage of the first client may be transparent to the second client and the second client may function as if connected directly to a traditional wireless access point. The second client's network usage may be transparent to the first client.

At block 270, the first client may disable the Portable Wireless Range Extender which may disconnect network access for the second client. The first client may then connect to the network using standard network connectivity provided by their network access device.

Figure 3:
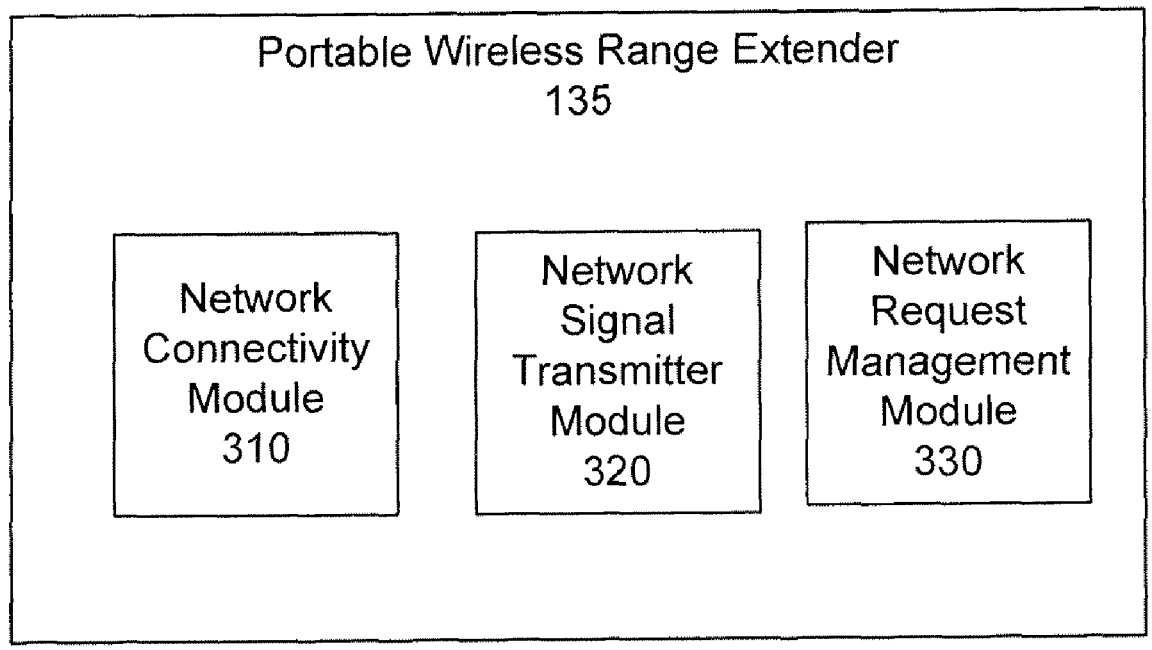
FIG. 3 depicts a wireless access network range extender system, according to an embodiment of the present invention.

FIG. 3 depicts a wireless access network range extender system, according to an embodiment of the present invention. Portable Wireless Range Extender 135 may represent a portable wireless range extender that may be contained on a device with network access. Portable Wireless Range Extender 135 may comprise one or more of the following modules: Network Connectivity Module 310, Network Signal Transmitter Module 320, and Network Request Management Module 330.

Network Connectivity Module 310 may enable the connectivity of one or more devices to a network. According to an embodiment, Network Connectivity Module 310 may allow for concurrent network access between a first device containing or associated with Portable Wireless Range Extender 135 and one or more devices accessing a network through the networking capabilities of the first device. Network Connectivity Module 310 may terminate network connectivity for one or more devices if Portable Wireless Range Extender 135 is disabled when the one or more devices are connected.

Network Signal Transmitter Module 320 may enable the transmission of network access signals. According to one embodiment, Network Signal Transmitter Module 320 may utilize networking capabilities of a first device containing or associated with Portable Wireless Range Extender 135. For example, Network Signal Transmitter Module 320 may use a wireless network access card of a first device to transmit network access signals. In other examples, Network Signal Transmitter Module 320 may transmit network access signals to a network port of the first device. Other devices may then connect to the wired network port to access a network.

Network Request Management Module 330 may receive one or more network access requests from devices. According to one embodiment, network access requests may be routed to a network connected to a device containing or associated with Portable Wireless Range Extender 135. A device containing Portable Wireless Range Extender 135 may route its own network access requests to Portable Wireless Range Extender 135 which may be received by Network Request Management Module 330. If Portable Wireless Range Extender 135 is disabled, Network Request Management Module 330 may refuse requests for network access.

Figure 4:
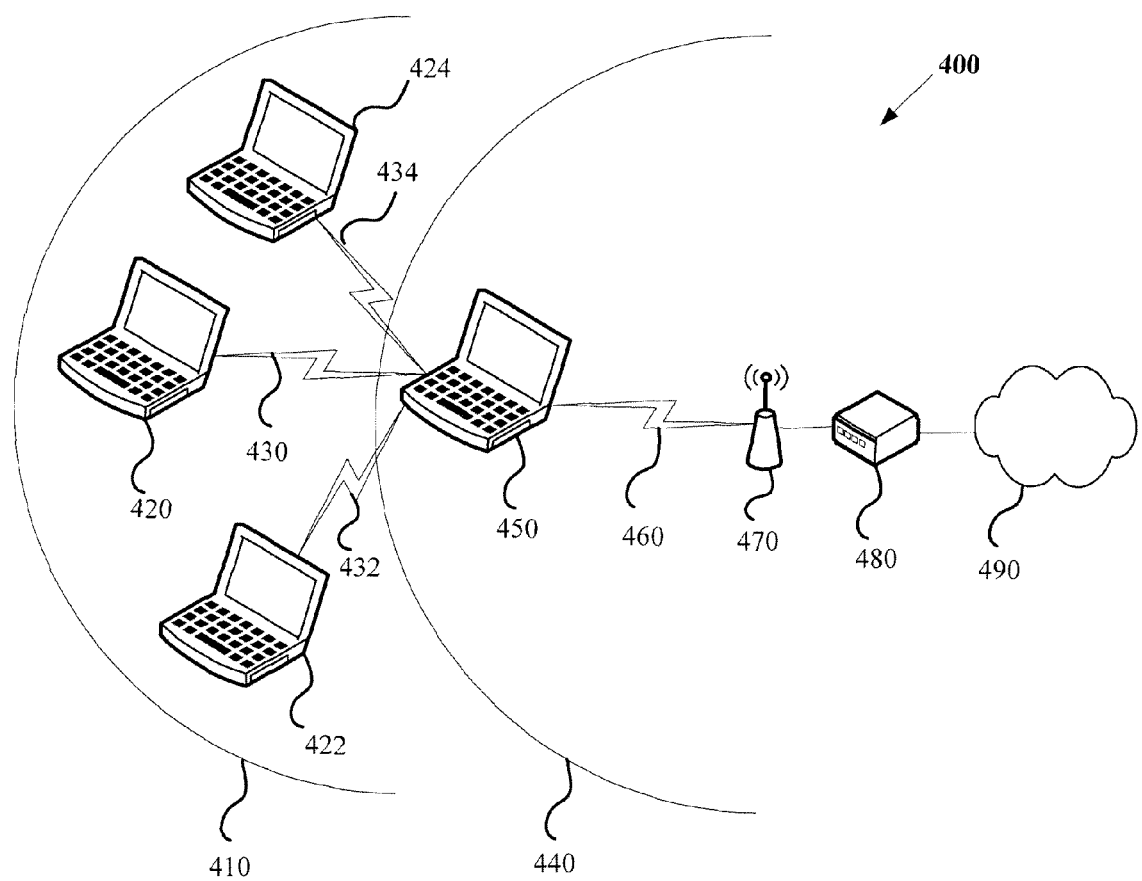
FIG. 4 illustrates an exemplary wireless access network range extender system, according to an embodiment of the present invention.

FIG. 4 illustrates an exemplary wireless access network range extender system, according to an embodiment of the present invention. System 400 illustrates an exemplary system for extending the range of wireless communication with a portable device. As illustrated, Laptop 420, may connect via Network Connection 430 to Laptop 450. One or more additional laptops or other devices with wireless networking capability may also connect to Laptop 450. For example, Laptop 422 may connect to Laptop 450 using Network Connection 432 and Laptop 424 may connect to Laptop 450 using Network Connection 434. Laptop 450 may connect to Wireless Access Point 470 using Network Connection 460. Connectivity to Network 490 may be provided to Laptop 420 and Laptop 450 via Wireless Access Point 470 and Network Access Device 480. Network Access Range 410 may represent a signal range limitation of a wireless access device associated with Laptop 450. Network Access Range 440 may represent a signal range limitation of a Wireless Access Point 470.

Laptop 450 may contain or be associated with Portable Wireless Range Extender 135, according to some embodiments. For example, a user of Laptop 420 may wish to connect to Network 490. However Laptop 420 may be located beyond signal range 440 of the nearest wireless access point, Wireless Access Point 470. Portable Wireless Range Extender 135 may use networking capabilities of Laptop 450 and may retransmit the signal which may result in Network Access Range 410. Laptop 420 is within range 410 and may then create network connection 430. Laptop 422 and Laptop 424, also within range 410 may connect in a similar manner. Laptop 420, Laptop 422, Laptop 424 and Laptop 450 may be concurrently connected to Network 490.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   managing one or more network connections of a first device;
   transmitting a signal for network access from the first device;
   receiving a request for network access at the first device from a second device;
   transmitting one or more network access requests to a network from the first device for the second device; and
   providing concurrent network access for the first device and the second device, wherein the network access for the first device comprises network communications carrying data generated by the first device; and
   enabling a user of the first device to select whether to enable or disable transmission of the signal for network access for the second device;
   wherein the user of the first device is provided network access when the first device is transmitting the signal for network access for the second device and when the first device is not transmitting the signal for network access for the second device.

2. The method of claim 1 wherein the first device is a portable computer.

3. The method of claim 1 wherein the act of transmitting comprises transmitting a radio signal for network access from a wireless access device of a portable computer.

4. The method of claim 3 wherein the act of transmitting comprises transmitting a signal for network access from a wired network access device of a portable computer.

5. The method of claim 1 wherein the first device receives a network signal over a wired connection.

6. The method of claim 1 wherein the first device receives a network signal over a wireless connection.

7. A system comprising:
   a network connectivity module that manages one or more network connections of a first device, providing concurrent network access for the first device and one or more additional devices, wherein the network access for the first device comprises network communications carrying data generated by the first device and provides an option for users of the first device to enable or disable transmission of the signal for network access;
   a network signal transmitter module that transmits a signal for network access from the first device; and
   a network request management module that receives a network access request from a second device and transmits a network access request to a network from the first device for the second device;
   wherein users of the first device are provided network access when the first device is transmitting the signal for network access; and
   users of the first device are provided network access when the first device is not transmitting the signal for network access.

8. The method of claim 7 wherein the first device is a laptop computer transmitting a radio signal for network access from a wireless access device of the laptop.

9. The method of claim 7 wherein the first device is a laptop computer transmitting a signal for network access from a wired network access device of the laptop.

10. The method of claim 7 wherein the first device receives a network signal over a wired connection.

11. The method of claim 7 wherein the first device receives a network signal over a wireless connection.

12. A non-transitory computer readable media containing code performing the steps of claim 1.

13. A method, comprising:
   managing one or more network connections of a first network client;
   transmitting a wireless access signal from the first network client;
   receiving a request for network access at the first network client from a second network client;
   transmitting one or more network access requests to a network for the second network client from the first network client; and
   providing concurrent network access for the first network client and the second network client, wherein the network access for the first network client comprises network communications carrying data generated by the first network client; and
   enabling a user of the first network client to select whether to enable or disable transmission of the signal for network access for the second network client;
   wherein the user of the first device is provided network access when the first device is transmitting the signal for network access for the second device and when the first device is not transmitting the signal for network access for the second device.

14. A method, comprising:

utilizing network connectivity of a first network client to transmit a wireless access signal;

receiving a request for network access at the first network client from one or more secondary network clients;

transmitting one or more network access requests to a network for the one or more secondary network clients from the first network client; and providing concurrent network access for the first network client and the one or more secondary network clients, wherein the network access for the first network client comprises network communications carrying data generated by the first network client; and enabling a user of the first network client to select whether to enable or disable transmission of the signal for network access for the second network client;

wherein the user of the first device is provided network access when the first device is transmitting the signal for network access for the second device and when the first device is not transmitting the signal for network access for the second device.

* * * * *